United States Patent [19]

Rawdon et al.

[11] Patent Number: 5,184,366
[45] Date of Patent: Feb. 9, 1993

[54] AIRCRAFT CARGO HANDLING SYSTEM

[75] Inventors: Blaine K. Rawdon, Rancho Palos Verdes; Myles A. Rohrlick, Oceanside, both of Calif.

[73] Assignee: McDonnell Douglas Corporation, Long Beach, Calif.

[21] Appl. No.: 648,280

[22] Filed: Jan. 31, 1991

[51] Int. Cl.⁵ ............................................. B64D 9/00
[52] U.S. Cl. .................................... 14/71.5; 198/740; 198/741; 198/468.1; 244/137.1; 414/537; 414/535; 414/575.1
[58] Field of Search ................ 14/70, 71.1, 71.3, 71.5, 14/71.7; 414/537, 535, 525.1; 244/137.1, 137.4, 118.1; 198/740, 741, 468.1

[56] References Cited

U.S. PATENT DOCUMENTS

| | | | |
|---|---|---|---|
| 2,266,790 | 12/1941 | Norbom | 214/85 |
| 2,523,723 | 9/1950 | Santee et al. | 214/85 |
| 2,659,504 | 11/1953 | Kranawetvogel et al. | 214/318 |
| 3,147,942 | 9/1964 | Griffith | 244/137 |
| 3,392,858 | 7/1968 | Fernstrom et al. | 214/512 |
| 3,799,479 | 3/1974 | Roeder et al. | 244/137 |
| 3,836,101 | 9/1974 | Mattia et al. | 244/137 |
| 3,964,626 | 6/1976 | Arregui | 214/505 |
| 4,068,770 | 1/1978 | Boehringer | 214/85 |
| 4,165,810 | 8/1979 | Young | 414/595 |
| 4,221,536 | 9/1980 | McFee | 414/786 |
| 4,235,399 | 11/1980 | Shorey | 414/537 X |
| 4,344,726 | 8/1982 | Naffa | 410/79 |
| 4,365,699 | 12/1982 | Dussud | 193/35 |
| 4,684,311 | 8/1987 | Dickson-Wright et al. | 414/535 |
| 4,697,449 | 10/1987 | Harsch et al. | 198/740 X |
| 4,850,788 | 7/1989 | Dickson | 414/537 |

FOREIGN PATENT DOCUMENTS

| | | | |
|---|---|---|---|
| 2573372 | 5/1986 | France | 414/535 |
| 120181 | 9/1979 | Japan | 414/535 |

OTHER PUBLICATIONS

Keith Mfg. Co. Brochure; Apr. 12, 1991; Madras Ore.

Primary Examiner—William P. Neuder
Attorney, Agent, or Firm—Donald E. Stout; Gregory A. Cone; John P. Scholl

[57] ABSTRACT

An on-board aircraft cargo handling system comprises a plurality of tines which are mounted within a cargo ramp and beneath its surface and are capable of extension aft of the ramp across a truck bed or the like. The tines have a plurality of rollers extending above their top surfaces for permitting easy movement of cargo across the tines. The ends of the tines are tapered to allow them to be pushed under the cargo to be moved. Pallet retainers, which consist of arm members which have finger-like projections on one end for allowing interengagement of the arm members with notches on the cargo, are mounted to the cargo ramp in such a way as to permit movement of the arms for aligning them with the cargo notches. Additionally, the cargo ramp surface includes pop-up chocks, which may be extended above the surface to lift the cargo, thus permitting forklift tines to be slid underneath.

In a modified embodiment, the tines are mounted in open channels within the ramp, so that they are flush with the surface of the ramp in their retracted mode. Retractable friction brakes are employed on the surface of the tines, thus permitting the cargo to be moved in conjunction with the tines when the tines are being extended or retracted.

The advantage of the invention is that cargo may be moved directly and quickly from the aircraft to a truck cargo bed (or vice-versa) without the use of ground-based material handling equipment.

14 Claims, 4 Drawing Sheets

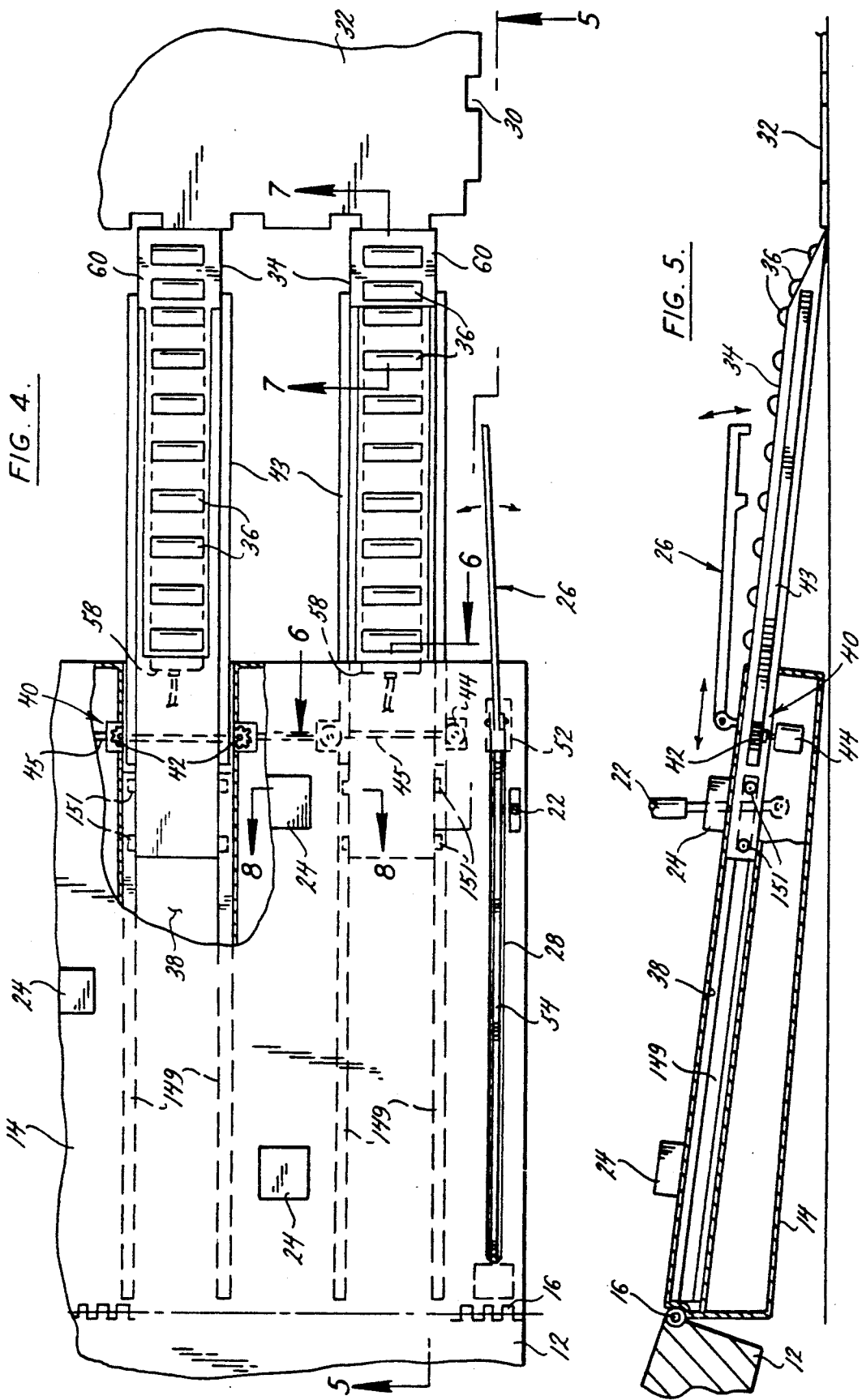

AIRCRAFT CARGO HANDLING SYSTEM

This application is related to applications Ser. No. 648,279, entitled "HINGED CARGO RAMP" and Ser. No. 648,281 entitled "CARGO RAIL SYSTEM FOR AN AIRCRAFT", both filed on even date herewith.

BACKGROUND OF THE INVENTION

This invention relates to cargo handling systems for aircraft, and more particularly to an on-board autonomous cargo handling system which minimizes the need for ground-based material handling equipment.

The loading or unloading of cargo aircraft typically is a labor intensive operation, involving the extensive use of ground-based material handling equipment, such as forklifts, and considerable manual labor. As a result, the process can be long, tedious, expensive, and dangerous. A typical process for unloading an aircraft involves moving the cargo, often by hand, down a cargo ramp onto the ground from the aircraft cargo bed floor. Then, a forklift is used to pick up the cargo and move it to a truck. The forklift tines are raised to the level of the cargo bed of the truck, after which the cargo is wrestled by hand from the tines onto the bed for transport to its destination. The process involves several steps and considerable danger of injury to the loaders responsible for manually moving the cargo. In the military setting, in particular, there are additional considerations. Often, the loading or unloading is taking place at an austere forward base where material handling equipment is unavailable or in short supply. Also, under such circumstances time may be critically short for performing the operation. Therefore, what is needed is an on-board cargo handling system which is easy to use, quick, and allows a direct transfer of cargo from the aircraft cargo bed to a truck bed without the use of ground-based material handling equipment and with a minimum of manpower.

SUMMARY OF THE INVENTION

This invention solves the problem outlined above by utilizing a segmented and hinged cargo ramp for ensuring straight-across loading and unloading of cargo between two surfaces of different heights. The ramp includes a plurality of tines which are mounted within the ramp and can be actuated to extend across a second of the two surfaces, typically a truck bed. The tines each have a tapered end which allows them to be pushed under the cargo, typically a military pallet of standard configuration. The tines each have a plurality of rollers which extend above their top surfaces. The rollers allow the cargo to be easily moved across the tines. At least one roller extends beneath the lower surface of the tines, to allow the tines to be rolled across the truck bed when being extended or retracted. The top rollers preferably are retractable beneath the tine's top surfaces.

Two embodiments are disclosed. The first embodiment is configured so that the tines retract into recesses which are completely enclosed within the ramp, beneath the surface. Pallet retainers are preferably used to hold the pallet in place while the tines are being extended or retracted. The pallet retainer comprises a pallet retainer arm which has at least one finger at or near one end of the arm. This finger is adapted to interengage with a notch on the pallet, such notches being standard on military pallets. The other end of the arm is mounted to an actuator which is in turn mounted to the cargo ramp. The actuator permits the arm to move lengthwise along the ramp and to swing inwardly or outwardly with respect to the ramp, in order to position the finger or fingers in alignment with the pallet notch. In operation, to unload a pallet from the aircraft to the truck bed, the ramp would be configured to bridge the space between the aircraft cargo bed and the truck bed. Then, the tines would be extended across the truck bed. Following this, the cargo would be moved onto the tines and the pallet retainer fingers would be engaged with the cargo notches. Then, the tines would be withdrawn and retracted back into the ramp recesses, leaving the pallet on the truck bed.

The second disclosed embodiment is configured so that the tines retract into channels which are open to the surface of the cargo ramp. When retracted, the tines are flush with the ramp surface. In this embodiment, the tines have retractable friction brakes on their top surfaces, as well as rollers. To unload a pallet from the aircraft to the truck bed, the ramp would again be configured to bridge the space between the aircraft cargo bed and the truck bed. The pallet would be moved onto the ramp, and the friction brakes would be extended. Then, the tines would be extended across the truck bed. Because the friction brakes would act to hold the pallet in place, the pallet would move onto the truck bed with the tines. Then, pallet retainers like those employed in the first embodiment could be used to hold the pallet in position while the tines were withdrawn, leaving the pallet on the truck bed.

An additional feature of this invention is that pop-up chocks are positioned on the cargo ramp. The chocks are extendable above the surface to lift a piece of cargo such as a pallet several inches into the air, thus enabling forklift tines to slide beneath the cargo and easily move it off the ramp, or vice-versa. When not in use, the chocks retract beneath the surface of the ramp for storage.

Therefore, it is an object of this invention to provide an easy-to-use on-board cargo handling system which allows for much more rapid loading and unloading of cargo without the use of ground-based material handling equipment.

It is also an object of this invention to provide a system which allows for direct transfer of cargo between the aircraft and the cargo bed of ground vehicles such as trucks.

It is a further object of the invention to provide pallet lift devices on the cargo ramp to allow for easier transport of cargo when ground-based material handling equipment is being used.

The above mentioned and other objects and features of this invention and the manner of attaining them will become apparent, and the invention itself will be best understood, by reference to the following description taken in conjunction with the accompanying illustrative drawings.

BRIEF DESCRIPTION OF THE DRAWINGS

FIG. 4 is a top plan view of the cargo ramp shown in FIG. 1;

FIG. 5 is a cross-sectional view along lines 5—5 of FIG. 4, showing details of the roller tine retraction mechanism.

DETAILED DESCRIPTION OF THE DRAWINGS

Figure 1:
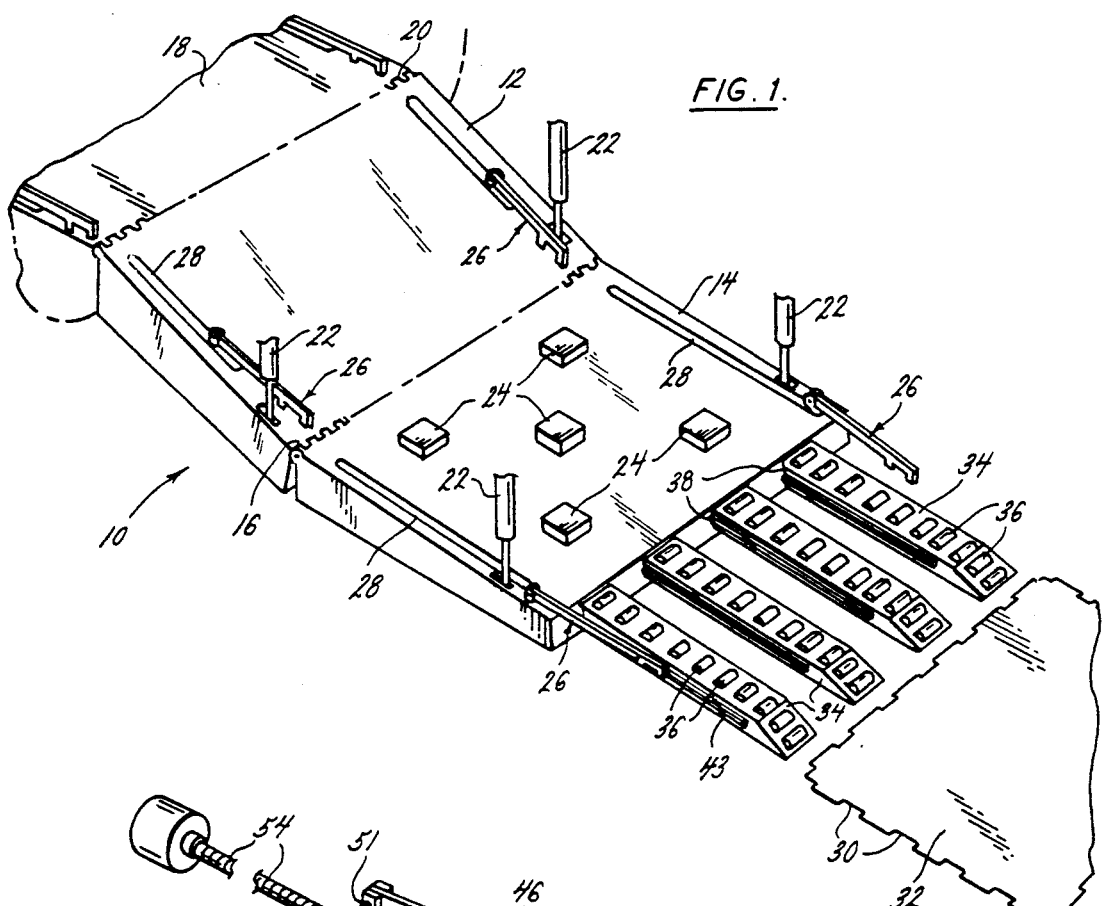
FIG. 1 is a perspective view showing a cargo ramp having the various features of the invention, including roller tines, pop-up chocks, and pallet retainers.

Referring now to FIG. 1, there is shown a cargo ramp 10 for a cargo aircraft which embodies the cargo handling system of the invention. Cargo ramp 10 is comprised of a forward ramp deck section 12 and an aft ramp section 14. The two ramp deck sections are connected by means of a hinge 16. Hinge 16 permits relative motion between ramp sections 12 and 14 in pitch and may also permit relative motion in roll in certain embodiments. Forward ramp section 12 is connected at its forward end to the aircraft cargo bed floor 18 by means of a hinge 20, which permits relative motion between the forward ramp section 12 and the cargo bed floor 18 in pitch. Two actuators 22 are attached to each ramp section 12, 14 at one end, and at the other end to some fixed point on the aircraft or on the ground, preferably the aircraft fuselage. The aircraft loadmaster may configure the ramp as desired by operation of the actuators to move each ramp section to its appropriate position. The resultant ramp offers the convenience of straight-across loading and unloading of cargo onto vehicles which have cargo bed heights different than the cargo bed height of the aircraft. Additional details of the hinged cargo ramp are disclosed in the related application entitled "HINGED CARGO RAMP", U.S. Ser. No. 648,279, filed on even date herewith, and herein incorporated by reference.

Figure 6:
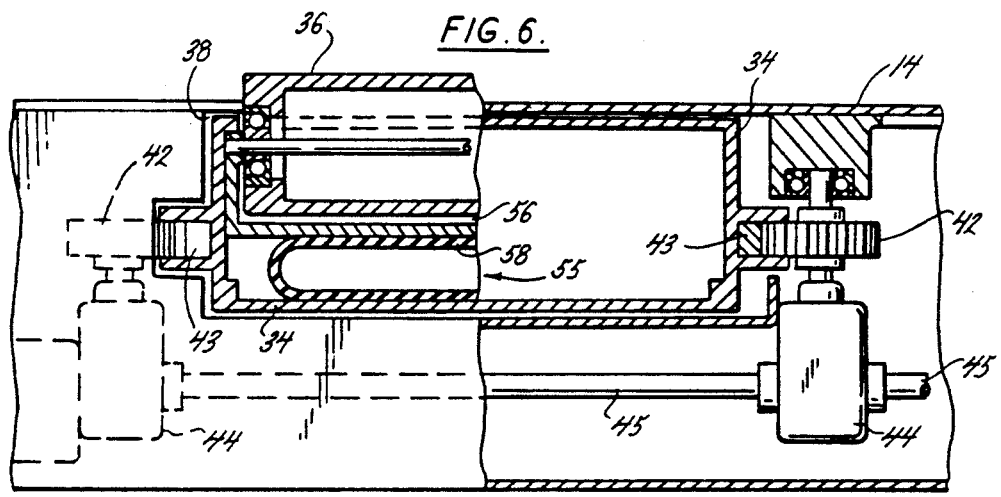
FIG. 6 is a cross-sectional view along lines 6—6 of FIG. 4, showing the actuation mechanism for the rollers on the roller tines.

Again referring to FIG. 1, five pop-up chocks 24 are shown on the surface of aft ramp section 14. Two pallet retainers 26 are mounted in slots 28 on aft ramp section 14 for interengagement with notches 30 on a pallet 32. Pallet 32 is a standard military pallet comprised of a single solid plate of material and having no gap like that found in conventional commercial pallets, between the upper and lower surfaces, for inserting forklift tines. Notches 30 are standard on such military pallets. Roller tines 34 have rollers 36 on their top surfaces, and extend from recesses 38 within aft ramp section 14 and beneath the surface thereof. Viewing FIGS. 4, 5, and 6, rack and pinion mechanism 40 permits extension and retraction of the roller tines 34 out of and into the recesses 38. Pinions 42 are mounted to the aft ramp section 14, while each rack 43 is mounted to its respective roller tine 34. The pinions 42 are ganged together via drive motors 44 and shafts 45 as shown in FIGS. 4 and 6 in order to actuate the roller tines 34 in unison. Of course, other equivalent actuation means could be employed, such as jackscrews or hydraulic actuators.

Figure 2:
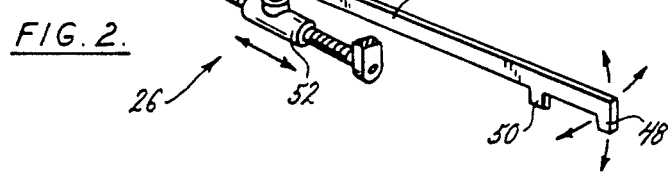
FIG. 2 is an enlarged view of the pallet retainer of FIG. 1, shown in isolation.
Figure 3:
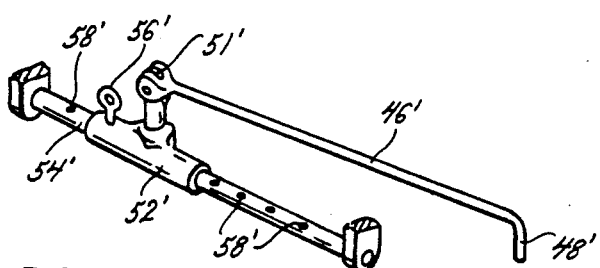
FIG. 3 is a modified embodiment of the pallet retainer shown in FIG. 2.

Referring now to FIG. 2, one embodiment of pallet retainer 26 is shown. In this embodiment, pallet retainer arm 46 has spaced fingers 48 and 50 extending from its outer end and adapted for engagement with the notches 30 on the pallet 32. Arm 46 is mounted at its base fitting 51 to a mounting sleeve 52, which is internally threaded and mounted on jackscrew actuator 54 so that its internal threads are engaged with the external threads on the actuator 54. Jackscrew actuator 54 is positioned within slot 28 and is adapted for reversible rotation, thus allowing arm 46 to travel back and forth along the length of the actuator 54 by means of the threaded connection of mounting sleeve 52 with the jackscrew actuator so that fingers 48, 50 may be positioned for proper engagement with the pallet notches 30. Further assisting proper positioning of fingers 48 and 50 is the base fitting 51, which may be released to permit arm 46 to swing to the side edge of the pallet 32. FIG. 3 shows a modified embodiment of the pallet retainer 26, wherein pallet retainer arm 46' is mounted at its base fitting 51' to mounting sleeve 52' which in turn is mounted onto shaft 54' using a detent pin 56', which can be inserted into any one of the holes 58' located in the shaft 54'. Only a single finger 48' is shown on arm 46' in this embodiment, although the same finger configuration as is shown in the FIG. 2 embodiment could be used. To properly position the finger 48' for engagement with the pallet notch 30, the pin 56' is lifted out of the hole 58', then the mounting sleeve 52' is slid along the shaft to the desired location, after which the pin 56' is reinserted into the corresponding hole 58'. Again, the base fitting 51' permits the arm 46' to swing to the side edge of the pallet for proper positioning of the finger 48'.

Figure 7:
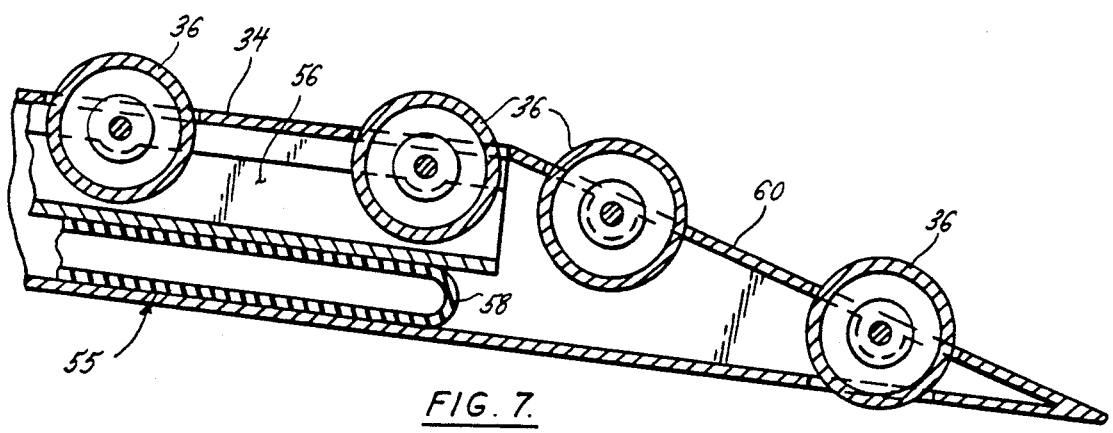
FIG. 7 is a cross-sectional view along lines 7—7 of FIG. 4, showing the roller arrangement on the roller tines.

Referring now to FIGS. 6 and 7, the details of the roller actuator 55 for extending and retracting rollers 36 are shown. Roller well 56 is of a depth sufficient to completely house rollers 36 beneath the surface of tines 34. When it is desired to extend the rollers above the surface of the tines, bellows 58 are pneumatically inflated, thereby pushing the rollers upward into the extended position. Viewing FIG. 7, in particular, it can be seen that the aft portion 60 of the tines is tapered like the tines of a forklift, in order to push the tines under a pallet or other cargo. In this tapered portion, the rollers 36 are not retractable, but are always extended, as shown. Note that the aft-most roller extends both above the upper surface and beneath the lower surface of the tine, for reasons which will be made clear below. Alternatively to the arrangement shown here, the tines could be arranged to have fixed lower rollers along their entire length, each extending beneath the lower surface of the tines. Also, a different type of actuator could be used, such as a hydraulic or mechanical actuator, of a type well known in the art. Compressed air to inflate the bellows 58 could be obtained from a variety of sources, such as bleed air from the engine compressor, a dedicated system compressor, or an on-board inert gas generator system, all of which are well known sources for pressurized working fluid.

Figure 8:
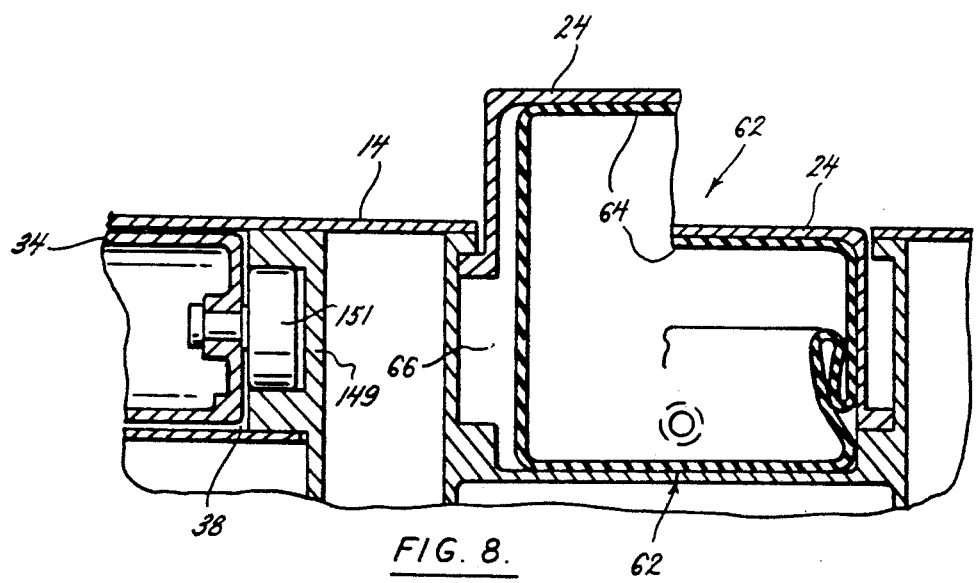
FIG. 8 is a cross-sectional view along lines 8—8 of FIG. 4, showing the actuation mechanism for the pop-up chocks.

FIG. 8 shows a cross-sectional view of the actuation system 62 for pop-up chocks 24. Again, a bellows 64 of the roll-up type is shown, which when inflated pushes pop-up chock 24 out of its well 66 and extends it above the surface of the aft ramp section 14. The system works in the same manner as does the actuator for the rollers 36 as discussed above. When retracted, the pop-up chocks 24 are flush with the ramp surface in order to permit free movement of the cargo across the surface. FIG. 8 shows a broken away view of the chock 24, with the left half of the chock shown in its extended mode and the right half shown in its retracted mode.

In operation, in order to load a cargo pallet 32 onto the aircraft, the loadmaster first configures the ramp 10 to permit a direct transfer of the cargo between the aircraft cargo bed floor 18 and a truck cargo bed or the ground. Then, actuating the rack and pinion 40, the roller tines 34 are extended from recesses 38 out across the truck cargo bed, rolling across the truck cargo bed on aft-most roller 36, which extends beneath the tines lower surface. The pallet retainers 26 are positioned so that the fingers 48 and 50 on arm 46 interengage with notches 30 on the pallet 32, thus holding the pallet firmly in position. Then, the tapered portion 60 of the tines 34 is shoved under the cargo pallet 32 until the pallet rests completely on the tines' rollers. At this point, the pallet is moved onto the aft ramp section 14 and from there onto the aircraft in a manner described in related application Ser. No. 648,279, filed on even date herewith and incorporated by reference above. To unload a cargo pallet from the aircraft, the above procedure is performed in reverse, with the tines 34 again being extended out across the truck bed as described above. The pallet 32 is moved aft onto the tines. Following this, the pallet retainers 26 are positioned to hold the pallet in place by interengaging fingers 48 and 50 with notches 30, after which the tines 34 are retracted into recesses 38, leaving the cargo pallet on the truck bed.

A more automated version of pallet retainer 26 (not shown) would permit the arm 46 to be positioned for engagement of the fingers 48, 50 with the notches 30 by using an up-down actuator and an inboard-outboard actuator to move the arm, thus mooting the necessity for manual actuation. It is also possible to employ a heavier duty jackscrew or chain drive actuator so that the pallet retainers could actually push or pull the cargo pallet. In such an embodiment, to load a pallet onto the aircraft from a truck the roller tines 34 would be extended across the truck bed as before. The pallet retainers 26 would be positioned so that the fingers 48, 50 on arm 46 would be interengaged with the pallet notches 30 to hold the pallet 32 in position. Then, the roller tines would be shoved under the pallet until the pallet rested completely on the rollers 36. However, at this point, instead of manually moving the pallet onto the aft ramp section 14, the pallet retainers 26 could be actuated to pull the pallet onto the ramp. A similar operation, in reverse, would be conducted to unload the aircraft.

Oftentimes ground material handling equipment is available and would be used to load or unload cargo to or from the aircraft. Military pallets, such as pallet 32, are difficult to lift with a forklift because they consist of a flat single plate of material which rests flush on the ground. Pop-up chocks 24 assist in such circumstances by lifting the pallet off the ramp, permitting the forklift tines to be slid underneath the pallet for unloading the pallet from the aircraft or to be slid out from underneath the pallet for loading it onto the aircraft. Specifically, when unloading a pallet 32 from the aircraft, the pallet will be resting on aft ramp section 14. Bellows 64 will be actuated pneumatically, to inflate and thereby push the chock 24 out of its well 66 and above the surface of the ramp section. As a result, the pallet will also be lifted upwardly several inches, permitting the forklift tines to be inserted underneath the pallet, after which the bellows 64 are deflated. At this point, the pallet 32 rests on the forklift tines and may be offloaded. Similarly, when loading a pallet onto the aircraft, the forklift will maneuver the pallet so that it is positioned on the aft ramp section 14, with the tines of the forklift resting on the ramp section surface. Then, the chocks 24 are lifted, permitting the operator to back the forklift tines out from beneath the pallet, after which the pop-up chocks are retracted. The pallet 32 now rests on the surface of the aft ramp section. Of course, a fewer or greater number of pop-up chocks 24 may be used to accomplish the desired function, with five chocks being only representative of a typical number which may be employed. What is important is that the pallet structural loads be distributed acceptably when the pallet is supported solely by the chocks. Preferably, the pop-up chocks 24 and their actuators 62 are all operated in concert. Also, other types of actuators may be employed, both hydraulic or pneumatic. If hydraulic, the actuator would typically consist of the end of the hydraulic cylinder. If pneumatic, it could consist of a bladder or bellows, as described above, or the end of the pneumatic cylinder.

Figure 9:
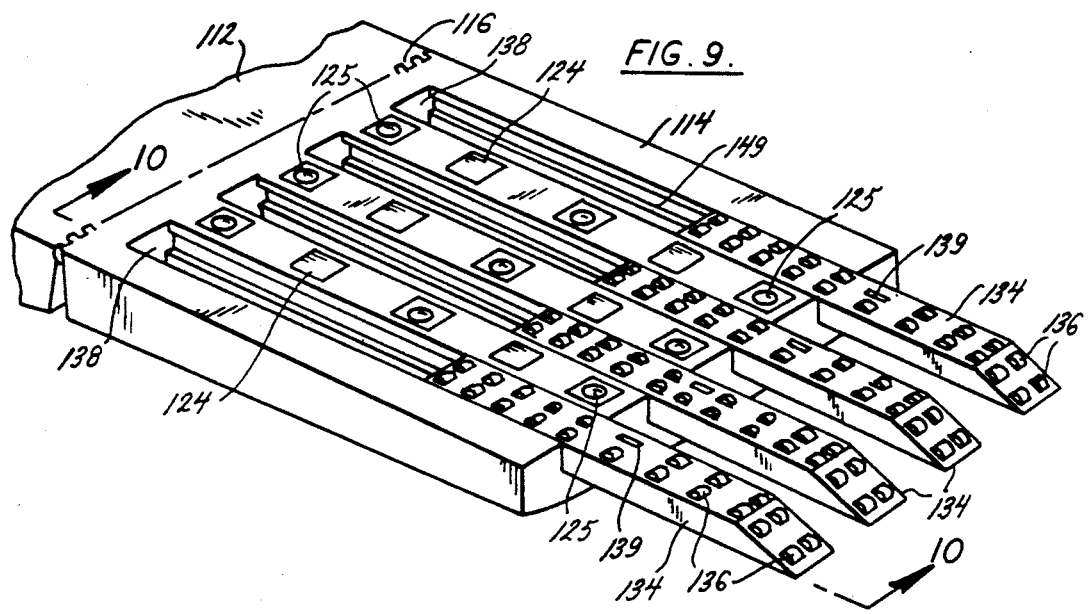
FIG. 9 is a perspective view of a modified embodiment of the cargo ramp shown in FIG. 1.
Figure 10:
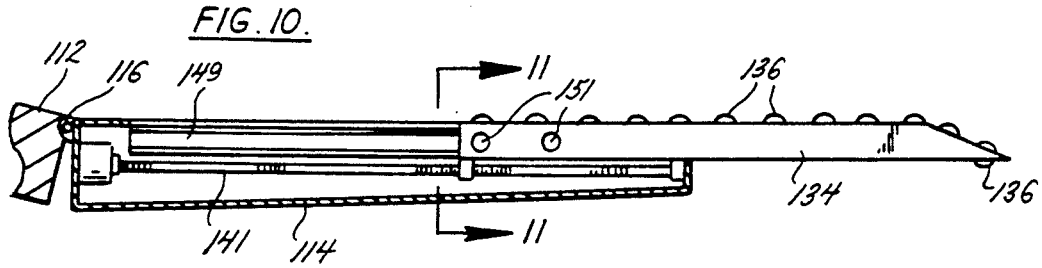
FIG. 10 is a cross-sectional view along lines 10—10 of FIG. 9, showing the roller tine arrangement.
Figure 11:
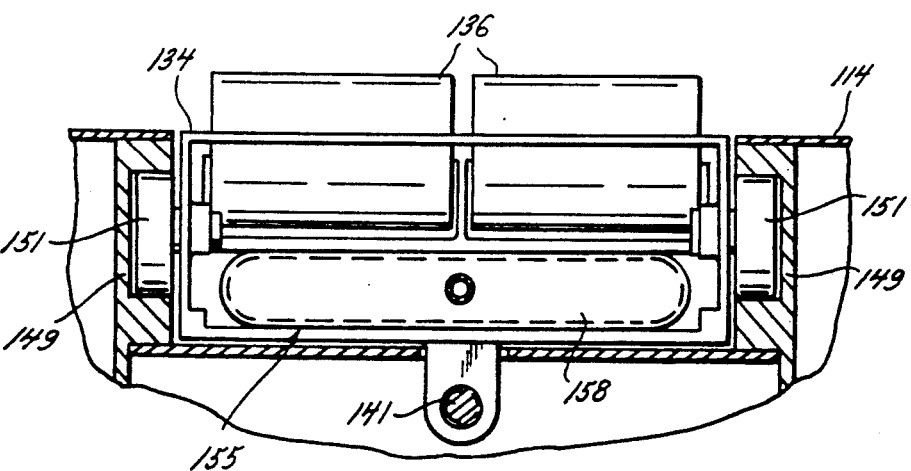
FIG. 11 is a cross-sectional view along lines 11—11 of FIG. 10, showing the actuation mechanism for the roller tine rollers.

FIGS. 9-11 show a modified embodiment of the inventive cargo handling system wherein the major difference is that the roller tines, when retracted, are flush with the surface of the aft ramp section rather than beneath the surface within a recess as in the FIG. 1 embodiment. Forward ramp section 112 is attached to aft ramp section 114 by means of a hinge 116. Six pop-up chocks 124 and six omni-directional rollers 125 are positioned on the surface of the aft ramp section 114. Roller tines 134 have rollers 136 on their top surfaces, and are mounted in channels 138 so that they are flush with the surface of the aft ramp section 114. The aftmost roller 136, on the tapered portion of the tine 134, both extends above the tine upper surface and extends below the tine lower surface, as in the FIG. 1 embodiment. Retractable friction brakes 139 are mounted on the tines 134 and jackscrew actuator 141 extends and retracts the tines 134. Further assisting movement of the tines along the channel 138 are guide tracks 149, along which wheels 151 run as the tines 134 are extended aft of the aft end of the ramp section 114 or retracted into the channels 138. The wheels 151 are connected to the side of the roller tines 134. As a result of these guide provisions, the roller tines extend and retract smoothly and quickly.

Referring to FIG. 11, the actuation system 155 for extending and retracting the rollers 136 is shown. This system operates in the same manner as for the rollers 36 in the FIG. 1 embodiment, with the bellows 158 being inflated pneumatically to push the rollers 136 above the tines upper surface and being deflated when retraction is desired. The friction brakes 139 may be retracted and extended by any conventional means, such as pneumatic bellows, hydraulically, or mechanically, as by a spring loading arrangement.

The remaining elements in the FIG. 9 embodiment are the same as in the FIG. 1 embodiment, some items not being shown for the sake of clarity. Pop-up chocks 124 are actuated in the same manner as the pop-up chocks 24 are actuated in the FIG. 1 embodiment. Many changes and modifications could be made to the FIG. 9 embodiment without changing the scope of the invention or materially changing its operation. For example, the roller tines 134 could be extended and retracted using a rack and pinion arrangement as in the FIG. 1 embodiment rather than a jackscrew. Different numbers of pop-up chocks 124 and omni-directional rollers 125 could be employed other than six. The rollers 136 could be arranged differently, such as in the single roller arrangement of FIG. 1, rather than side-by-side, and rollers could be positioned along the entire tines bottom surface.

In operation, the loadmaster would operate the FIG. 9 embodiment in a similar manner to the FIG. 1 embodiment. The forward and aft ramp sections are configured to provide for straight-across loading from the aircraft cargo bed to a truck bed or the ground. Then, by acutating the jackscrew 141, the roller tines 134 are extended aft to the aft ramp section 114 out across the truck cargo bed, rolling across the truck cargo bed on the aft-most roller 136. The tapered portion of the tines 134 are shoved under the pallet until the pallet rests completely on the tines' rollers. At this point, friction brakes 139 are extended, which holds the pallet in place with respect to the tines, so that when the tines are subsequently retracted the pallet will be brought with them onto the aft ramp section. To unload the aircraft a reverse process would take place, the friction brakes 139 being extended so that the cargo follows the tines aft onto the truck bed as the tines are extended. Then, if desired, pallet retainers such as those shown in the FIG. 1 embodiment (element 26) could be employed to hold the pallet in position while the tines were retracted into the channels 138.

Although exemplary embodiments of the invention have been shown and described, many changes, modifications, and substitutions may occur to one of ordinary skill in the art without departing from the spirit and scope of the invention. In particular, it may be noted that this invention could be used with any state of the art cargo ramp for any type of transport vehicle, and is not in any way limited to use with segmented, hinged cargo ramps, nor is it limited to aircraft applications.

We claim:

1. A cargo handling system for conveying cargo between two surfaces, said cargo handling system comprising:
    a cargo ramp including at least one ramp section, a first end of said cargo ramp being adapted to abut a first of said two surfaces and a second end of said cargo ramp being adapted to abut a second of said two surfaces, said cargo ramp thereby bridging a space between said two surfaces;
    a plurality of roller tines, said roller tines being mounted within said cargo ramp;
    roller tine actuation means for extending and retracting said roller tines, the roller tines being extended toward and across said second surface;
    said roller tines each having a tapered end for assisting in loading cargo onto said tines, said tapered end enbaling said tines to be pushed under said cargo;
    said roller tines each further having a plurality of rollers extending above a top surface thereof, said top rollers enabling cargo to be easily moved across said tines;
    said cargo ramp having at least one pallet retainer thereon, said pallet retainer comprising a pallet retainer arm, the arm being adapted for interengagement with said cargo, said arm further being mounted at its other end to an actuator which is in turn mounted to said cargo ramp, said actuator permitting said arm to move lengthwise along said ramp and to swing inwardly or outwardly with respect to said ramp, so that the retainer arm may be aligned for interengaging with said cargo;
    whereby when it is desired to load cargo from said second surface to said first surface, said retainer arm is engaged with said cargo to retain the cargo in position, so that said roller tines may be extended across said second surface and beneath said cargo, after which said cargo is moved onto said cargo ramp and said roller tines are retracted back into said cargo ramp.

2. The cargo handling system as recited in claim 1, said roller tines further having at least one roller extending beneath a lower surface thereof, for enabling said tines to be rolled across said second surface when being extended or retracted.

3. The cargo handling system as recited in claim 1, said top rollers being retractable within said tines.

4. The cargo handling system as recited in claim 3, and further comprising a bellows actuator for extending said rollers above said tines top surface and for retracting said rollers into said tines.

5. The cargo handling system as recited in claim 1, said cargo ramp having a plurality of pop-up chocks thereon, said pop-up chocks being extendable above the surface of said ramp for lifting said cargo and allowing forklift tines to slide beneath said cargo, and further being retractable beneath said ramp surface when not in use.

6. The cargo handling system as recited in claim 5, said pop-up chocks being actuated by a pneumatic bellows positioned beneath said chocks.

7. The cargo handling system as recited in claim 1, said roller tines each being mounted within an open channel in said cargo ramp, in such a manner that the roller tines are flush with the surface of said ramp and open thereto when in the retracted position.

8. The cargo handling system as recited in claim 7, wherein said roller tines each have at least one friction brake thereon, said friction brakes being extendable above the top surface of said roller tines when said cargo is positioned on said tines, said friction brakes holding said cargo in place when said tines are being extended or retracted, in such a manner that said cargo moves in conjunction with said tines.

9. The cargo handling system as recited in claim 1, said roller tines each being mounted within a recess in said cargo ramp, in such a manner that said roller tines are positioned completely within said cargo ramp and beneath its surface when in the retracted position.

10. The cargo handling system as recited in claim 1, wherein said first surface comprises an aircraft cargo bed floor and said second surface comprises a truck cargo bed floor.

11. The cargo handling system as recited in claim 1, wherein said pallet retainer arm has at least one finger at or near one end thereof and said cargo has at least one notch therein, said at least one finger and said notch interengaging in order to interengage said pallet retainer arm and said cargo.

12. A cargo handling system for conveying cargo between two surfaces, said cargo handling system comprising:
    a cargo ramp including a first ramp deck section, a second ramp deck section, and a hinge attaching said first and second ramp deck sections, said first ramp deck section being adapted to abut said first surface and said second ramp deck section being adapted to abut said second surface, said cargo ramp thereby bridging a space between said two surfaces;

a plurality of roller tines, said roller tines being mounted within said cargo ramp;

roller tine actuation means for extending and retracting said roller tines, said roller tines being extended toward and across said second surface;

said roller tines each having a tapered end for assisting in loading cargo onto said tines, by enabling the tines to be pushed under the cargo, and further each having a plurality of rollers extending above a top surface thereof, said top rollers enabling cargo to be easily moved across said tines; and actuators attached to said first and second ramp deck sections for moving each ramp deck section independently of the other so that said ramp may be configured as desired for bridging said first and second surface;

whereby when it is desired to load cargo from said second surface to said first surface, said roller tines are extended across said second surface and beneath said cargo, after which said cargo is moved onto said cargo ramp and said roller tines are retracted back into said cargo ramp.

13. The cargo handling system as recited in claim 12, wherein said cargo ramp has at least one pallet retainer thereon, said pallet retainer comprising:

a pallet retainer arm, said arm having at least one finger at or near one end thereof, said finger being adapted for interengagement with a notch on said cargo;

said arm being mounted at its other end to an actuator which is in turn mounted to said cargo ramp, said actuator permitting said arm to move lengthwise along said ramp and to swing inwardly or outwardly with respect to said ramp, so that said retainer arm fingers may be aligned with said cargo notch;

said pallet retainer thereby retaining said cargo in position when said finger is engaged with said notch, so that said roller tines may be inserted beneath or withdrawn from beneath said cargo.

14. A cargo handling system for conveying cargo between two surfaces, said cargo handling system comprising:

a cargo ramp including at least one ramp section, a first end of said cargo ramp being adapted to abut a first of said two surfaces and a second end of said cargo ramp being adapted to abut a second of said two surfaces, said cargo ramp thereby bridging a space between said two surfaces;

a plurality of roller tines, said roller tines being mounted within said cargo ramp and each having a tapered end for assisting in loading cargo onto said tines, by enabling the tines to be pushed under the cargo, and each having a plurality of rollers extending above a top surface thereof, said top rollers enabling cargo to be easily moved across said tines;

roller tine actuation means for extending and retracting said roller tines, said roller tines being extended toward and across said second surface;

said roller tines being mounted within an open channel in said cargo ramp, in such a manner that the roller tines are flush with the surface of said ramp and open thereto when in the retracted position, and each further having at least one friction brake thereon, said friction brake being extendable above the top surface of said roller tines when said cargo is positioned on said tines, said friction brake holding said cargo in place when said tines are being extended or retracted, in such a manner that said cargo moves in conjunction with the tines;

whereby when it is desired to load cargo from said second surface to said first surface, said roller tines are extended across said second surface and beneath said cargo, after which said cargo is moved onto said cargo ramp and said roller tines are retracted back into said cargo ramp.

* * * * *